United States Patent [19]
Eldar

[11] 4,211,016
[45] Jul. 8, 1980

[54] METHOD AND CHART FOR ORGANIZING AND PRODUCING COLORS

[76] Inventor: Meir Eldar, 47 Uziel St., Jerusalem, Israel

[21] Appl. No.: 7,004

[22] Filed: Jan. 26, 1979

[30] Foreign Application Priority Data

Jan. 27, 1978 [IL] Israel .................................. 53906

[51] Int. Cl.$^2$ .......................................... G09B 19/00
[52] U.S. Cl. .................................................... 35/28.3
[58] Field of Search ................................ 35/28.3, 28.5

[56] References Cited

U.S. PATENT DOCUMENTS

| | | | |
|---|---|---|---|
| 3,474,546 | 10/1969 | Wedlake | 35/28.3 |
| 3,751,829 | 8/1973 | Foss | 35/28.3 |
| 4,009,527 | 3/1977 | Scott et al. | 35/28.3 |

FOREIGN PATENT DOCUMENTS

331767  1/1921  Fed. Rep. of Germany ............ 35/28.3

*Primary Examiner*—Harland S. Skogquist
*Attorney, Agent, or Firm*—Blair, Brown & Kreten

[57] ABSTRACT

The invention provides a method and chart for organizing, developing and depicting a multipigment scale of colors based on at least five basic colors and any chosen number of subdivisions therebetween. The method and chart are based on the development of a two dimensional array of a plurality of planar triangular groupings of distinct color points wherein the apices of each triangular grouping represents the color extremes of said groupings and the remaining color points within said grouping are arranged in equidistant transitional color intervals between said apices and between the apices of any subtriangles definable within the groupings, the groupings representing planar cuts of an m−1 dimensional pyramid the apices of which pyramid represent the basic colors chosen. Each color point in said array is assigned a composite coordinate value having a number of component coordinates equal to the number of basic colors used and representing the absolute amount of each basic color component of said color point, wherein the sum of all composite coordinate values for each point within the array is equal.

8 Claims, 3 Drawing Figures

METHOD AND CHART FOR ORGANIZING AND PRODUCING COLORS

The present invention relates to a method and chart for organizing, developing and depicting a multipigment scale of colors based on at least five basic colors and any chosen number of subdivisions therebetween and to a method for the production of colors based thereon.

More particularly the present invention is directed to a method and apparatus for the characterization, identification, organization, development, depiction and arrangement of a multipigment scale of colors adapted to enable controlled color mixing, reproduction, matching and choice from said multipigment scale, which scale is adapted to contain every possible color without exception given any chosen number of component basic colors and any chosen number of stepwise divisions between said basic colors.

In order that the invention and the following description be more readily understood certain basic definitions of terms and concepts such as color, basic color, value or brightness, chromaticity etc. are provided.

As used herein the term basic color refers to both chromatic basic colors, e.g. red, yellow, blue and other spectrum colors found in nature and/or chemically produced as pure basic colors and achromatic basic colors, i.e., black and white.

The term color is used to refer to any color composed of a plurality of basic colors which color is a function of and dependent on the quantities of basic colors and the number of steplike subdivisions between said component basic colors.

It has been common to discuss the identification and variation of colors in terms of Hue, Value and Chroma wherein Hue is what is controlled upon the change from one chromatic color to another, e.g., from yellow to green and from green to blue; Value is what is controlled upon making a color darker or lighter by combination with black and/or white; and chroma is what is controlled when a color is made more intense or greyer.

Thus the value of a color is usually determined by photographing a color in black and white and matching the shade of grey achieved in the photograph against a scale of light values of greys running from e.g. zero for black to e.g. 10 for white.

The chromaticity of a specific color is then measured on a scale extending between the pure color and said color's determined grey value.

From the first attempts to organize the world of colors and to explain and define the place of colors and their interrelationship there developed the model of the Double-Cone and the "Farbenkugel" or color globe.

According to these models chromatic colors are described in accordance with their order in the spectrum wherein the ends of the spectrum are joined and the ultraviolet and infra-red meet in a closed color circle forming the "equator" of the color globe and the achromatic colors black and white form the "poles" of said globe.

The envelope of the "globe" or "double cone" contains the chromatic colors which change to white or black as they approach the "poles". The represented inner volume of the globe contains the color points formed by interaction between the colors on the "envelope" and according to this model the center of the globe will be grey as a result of the interaction of the black and white and the complementary colors.

The differences between the "Farbenkugel" approach and the "Double-Cone" approach has been mainly merely a question of allocation and identification of color points on the envelope and in the body of the proposed model.

The most developed system based on this approach is that of A. H. Munsell (D. Mickerson. J. Opt. Soc. Am. 1940, 30 p. 575) based on the conception of a color globe. In the globe model developed by Munsell the central vertical axis represents the locus of neutral colors, with black at the bottom and white at the top. The lightness of the sample is called the value, and the distance of a sample in the solid above the black level is a measure of its value. The value scale, is divided into eleven levels, with a perfect black as 0 and a perfect white as 10. The distance of the sample from the central vertical axis is governed by the saturation or intensity of the color, a quality which is designated as chroma on the Munsell system. The chroma is also divided into a series of steps, numbered from the neutral axis outwards, grey having zero chroma.

Differences of hue in the Munsell solid are represented by the different planes around the vertical axis, the whole solid being conveniently divided into ten equal vertical segments. The five principal hues, red R, yellow Y, green G, blue B and purple P, occupy the central planes of alternate segments, while the intermediate hues YR, GY, BG, PB and RP are situated in the midplanes of the five remaining segments. To provide a closer grading, each segment is divided into ten sections numbered 1 to 10, and arranged so that the main hue in each segment is numbered 5. The hue of a sample is therefore designated by a number to indicate the section of the segment in which it occurs, followed by symbols to show the color of the segment concerned; thus 10P indicates the hue of section 10 of the purple segment.

The complete specification of a sample is expressed by writing the symbols for the hue and value, followed by a stroke and then the chroma. For example, the color defined as 10P 5/8 has the hue 10P, the value 5 and the chroma 8.

In this manner every color is defined by its three coordinates in the three-dimensional color globe.

This model and similar systems have several deficiencies and especially those which result from the inordinate amount of weight given to the achromatic colors black and white as opposed to the chromatic colors which number over one hundred, and which definitely exceed the three, five or even ten chromatic colors which formed the basis of prior art color organization theories and models.

Among these disadvantages are the fact that as the color points approach the "poles" they are so whitened or blackened as to rapidly lose distinguishable significance. Similarly as the color points approach the grey vertical central axis of the globe there occurs a crowding of colors which results in problems in spacing as well as a masking of colors by the dominant grey axis.

Another major problem with this geometric model is the assumption that a specific Hue, Value and Chroma will serve to define and designate only a single color which color can be reached by the combination of any two color points on the envelope meeting at said designated internal color point. If this assumption were true then any designated color point within the interior of the globe could be reproduced by a multitude of various color pair combinations and experience has shown that as a practical matter this is simply not so when combining different independent pigments as proven by the fact that when the same so-called "Standard" colors produced by different combinations are then further combined with other "Standard" colors different colors can result.

It is an object of the present invention to avoid said prior art difficulties and to present a more exact method and means for the characterization, identification, organization, development, depiction and arrangement of a multipigment scale of colors which scale is ordered in a manner which has been mathematically calculated to contain every possible color without exception generatable given any chosen number of component basic colors and any chosen number of stepwise divisions between said basic colors.

Thus the present invention provides a method for organizing and developing a multipigment color chart for the production and reproduction of any and all colors based on at least five basic colors (m) and any chosen number (n) of subdivisions therebetween comprising developing a two dimensional array of a plurality of planar triangular groupings of distinct color points wherein the apices of each triangular grouping represents the color extremes of said grouping and the remaining color points within said grouping are arranged in equidistant transitional color intervals between said apices and between the apices of any sub-triangles definable within the groupings, said groupings representing planar cuts of an m-1 dimensional pyramid the apices of which pyramid represent the "m" basic colors chosen; and assigning to each color point in said array a composite coordinate value having a number of component coordinates equal to the number of basic colors used and representing the absolute amount of each basic color component of said color point, wherein the sum of all composite coordinate values for each point within the array is equal.

In counterdistinction to said prior art systems the present method is based on the granting of an equal value to each basic color without exception. Thus the developed world of colors is limited and defined only by the number of component basic colors and the chosen number of stepwise subdivisions or spacing between said colors.

In this manner as the number of basic colors increases and the representation of the spectrum is widened the number of colors included is increased.

Furthermore as will be realized every color developed according to the methods of the present invention is unequivocally and uniquely defined as a function of its component basic colors or pigments and the spacing between them. The present method of course does not prevent the presentation of the colors generated also in terms of their identifying Value, Hue and Chroma or identifying criteria of other systems provided that the component basic colors are first identified by these or other criteria and the development between said colors is linear. The principle difference however between the presently proposed method and the prior art systems resides in the present basic assumption that a color is not merely a function of its chroma, Value and Hue or other three dimensional measures of colors but that it is in fact also a function of its component pigments and spacing between them.

It is also believed that the present approach to color identification which assumes a model of an m−1 dimensional pyramid the apices of which pyramid represent the m basic colors chosen and the representation of said model in a two-dimensional array of color points and triangular groupings representing planar cuts of said m−1 dimensional pyramid to be a novel and unique approach which can do much for the development of the color industry.

Thus according to the present invention there is provided a chart for organizing, developing and depicting a multipigment scale of colors based on at least five basic colors (m) and any chosen number (n) of subdivisions therebetween comprising a two dimensional array of a plurality of planar triangular groupings of distinct color points wherein the apices of each triangular grouping represents the color extremes of said grouping and the remaining color points within said grouping are arranged in equidistant transitional color intervals between said apices and between the apices of any sub-triangles definable within the groupings and wherein said groupings represent planar cuts of an m−1 dimensional pyramid the apices of which pyramid represent the m basic colors chosen.

In another aspect of the present invention there is provided a method for the controlled production of any and all colors based on at least five basic colors and any chosen number of subdivisions therebetween comprising taking a two dimensional array of a plurality of color points and planar triangular groupings of distinct color points wherein each color point in said array is assigned a composite coordinate value having a number of component coordinates equal to the number of basic colors used and representing the absolute amount of each basic color component of said color point, the sum of all composite coordinate values for each point within the array being equal to or a multiple of (n−1), wherein n is the chosen number of subdivision between each pair of basic colors including the color points of said basic colors themselves, and wherein the apices of each triangular grouping within the array represents the color extremes of said grouping and the remaining color points within said grouping are arranged in equidistant transitional color intervals between said apices and between the apices of any sub-triangles definable within the groupings, said groupings representing planar cuts of an m−1 dimensional pyramid the apices of which pyramid represent the basic m colors chosen; and mixing the amount of each basic color assigned to the composite coordinate value of the color point chosen for production, whereby any and all of the colors producible given the chosen number (m) of basic colors and the chosen number (n) of subdivisions therebetween is producible.

According to the model of the present invention as mathematically derived all the possible colors result from the base colors $(X_i)$, wherein $i=1,2,\ldots,m$. Representing every color as an independent variable $X_i$ $(i=1,2,\ldots,m)$ which is measured in the physical quantities of the opaque colors used an m dimensional space is created wherein all the base colors and all the colors resulting from mixing them may be presented as a vector point in said m space having identifying coordinates $(X_1, X_2 \ldots X_m)$. Where $x_i \geq 0$ and $(i=1,2,\ldots m)$ the connecting of such a point with the origin $(0,0,0 \ldots 0)$ forms a line segment which may be extended and measured at will, i.e. by a measuring unit $a \geq 0$, i.e. $(aX_1, aX_2, \ldots aX_m) = a(x_1, X_2, \ldots, X_m)$. It can be seen that the factor "a" does not alter the ratios between the colors $X_i/X_j$ $i \neq j$, $(i,j=1,2,\ldots m)$ but only changes the total quantity of the color. Representing all the possible values of $x_i \geq 0$ ($i=1,2 \ldots, m$) in an m-dimensional space, there are generated all the possible colors in said m dimensional space, when each of the rays $a(x_1, x_2, \ldots x_m)$ beginning at the origin and going to infinity, bearing in it throughout the same color is plotted. Altogether there is generated a colorful continuum which goes through all of the possible colors and shades of the base colors. In said continuum said generated color points can number infinity. It is possible to draw an $m-1$ dimensional hyperplane which intersects all of the m dimensional space i.e.:

$$\sum_{i=1}^{m} x_i = K, (0 \leq X_k \leq K),$$

because the variables ($X_i$) are expressed in physical units and K is a physical unit expressing the quantity of color. Said plane intersects the entire space and therefore intersects every ray $a(X_1, X_2, \ldots X_m)$ at the point where $$\sum_{i=1}^{m} X_i = K, (0 \leq X_i \leq K,)$$

whereby all the possible colors and shades may be described on said plane.

Let the said m-dimensional space be then imagined as being laticed with color points spaced at equal distances measured on the $X_i$, ($i=1,2, \ldots, m$) axes in natural unnegative units. There is no continuity in the given space, since the points represent stepwise divisions and intersection points between colors. At the origin of any given color ray the point $(0,0, \ldots, 0)$ results and, e.g., on the $X_1$ axis the points $(1,0,0 \ldots 0)$ $2(1,0,0, \ldots 0)$ result until infinity; and the same is true for $X_2, \ldots, x_m$. In a similar manner in all of the laticed space the vectors $(X_1, X_2, \ldots X_m)$ result when $[X_i] \geq 0$ and is a natural unnegative number. Drawing an $m-1$ dimensional hyperplane through the laticed space in such a manner that:

$$\sum_{i=1}^{m} x_i = n - 1 \quad 0 \leq [X_i] \leq n - 1$$

there is derived a criss-crossed plane where the number of points will be $$\binom{m + n - 2}{n - 1}$$

and the distances between the points are "equal". All the points can be described on a different criss crossed plane in the shape of an equalateral triangle (when m is an odd number) of which each side has $$\binom{[\frac{m}{2} + 1] + n - 2}{[\frac{m}{2} + 1] - 1}$$

points.

While the invention will now be described in connection with certain of its preferred potential uses with reference to the following illustrative figures so that it may be more fully understood it is stressed that the particulars shown and described are by way of example and for purposes of illustrative discussion only and are presented in the cause of providing what is believed to be the most useful and readily understood description of the principles and conceptual aspects of the invention. In this regard no attempt is made to show more detail than is necessary for a fundamental understanding of the invention, the description taken with the drawings making apparent to those skilled in the art how the several forms of the invention may be embodied in practice.

Figure 1:
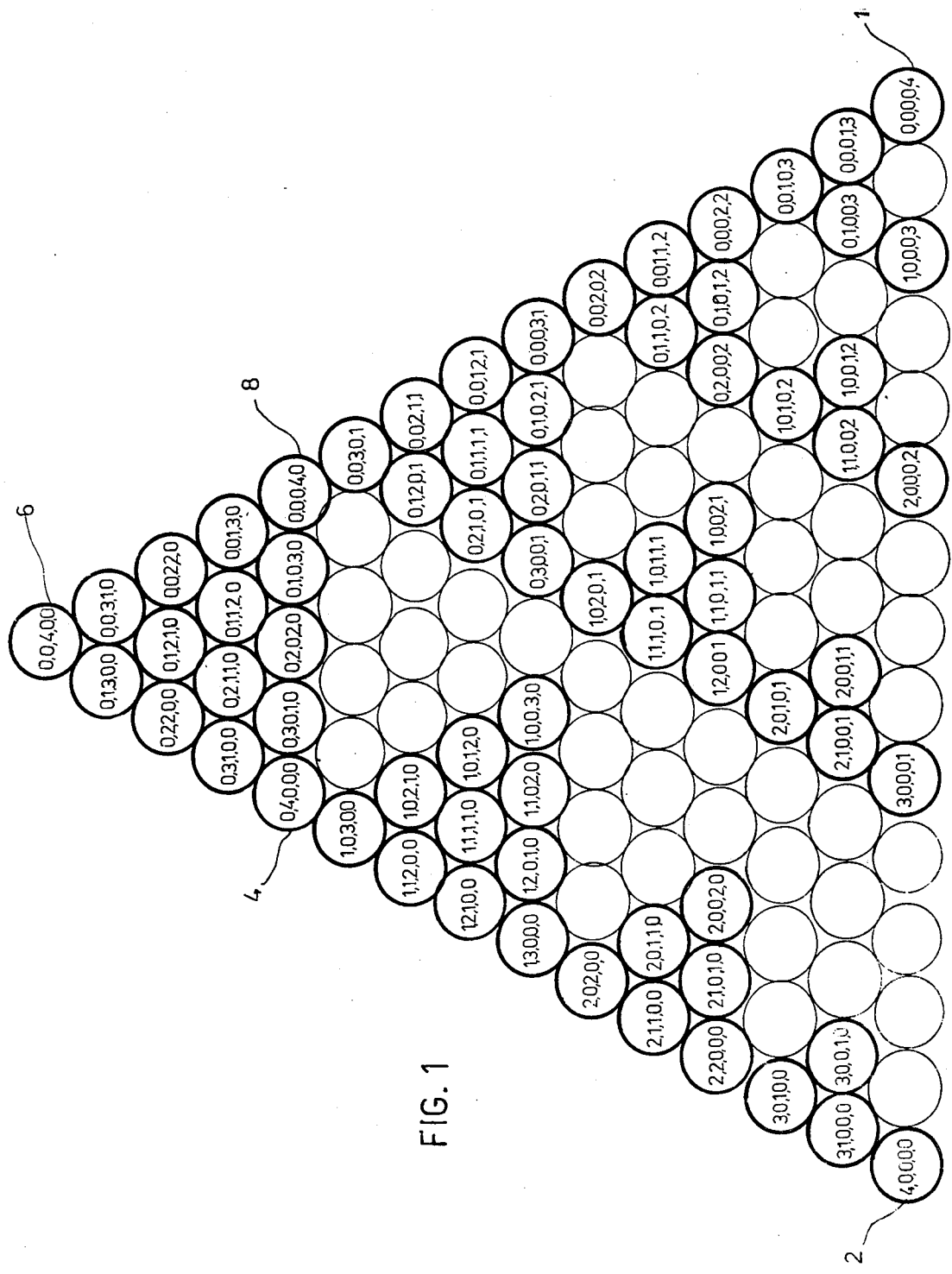
FIG. 1 is a schematic illustration of a color chart according to the invention based on five basic colors and five subdivisions between basic colors.

Referring first to FIG. 1 there is provided a schematic illustration of the simplest form of a color chart generated by the method of the present invention for the production and reproduction of any and all colors based on five basic colors (m) and five subdivisions therebetween.

As can be seen said chart comprises a two dimensional array of a plurality of planar triangular groupings and color points wherein each circle within the array represents a distinct color point and said groupings represent planar cuts of an $m-1$ dimensional pyramid the apices of which pyramid represent the five basic colors chosen. The apices of each triangular grouping represents the color extremes of said grouping and the remaining color points within said grouping are arranged in equidistant transitional color intervals between said apices and between the apices of any sub-triangles definable within the groupings.

As will be noted in the illustrated chart each color point in said array has been assigned a composite coordinate value having a number of component coordinates equal to the number of basic colors used and representing the absolute amount of each basic color component of said color point, wherein the sum of all composite coordinate values for each point within the array is equal.

Thus in said chart points 2, 4, 6, 8 and 10 represent the five basic colors chosen for intermixing and development of the scale of colors based on said chosen basic colors and in contradistinction to prior art systems none of said colors need to be black or white although they can be if desired.

In fact in preferred embodiments of the present invention said scale will be based on at least four chromatic colors.

For simplicity of development of said chart and intermixing of colors, each of said basic color points is preferably assigned on absolute coordinate value of $(n-1)$, or any multiple thereof wherein n is the chosen number of subdivision between each pair of basic colors in said chart including the color prints of said basic colors themselves as shown.

Referring back to the general development formula given hereinbefore of $$\binom{m+n-2}{n-1}$$

it can be seen that the present model develops all 70 of the possible colors generatable from five colors (m) and five subdivision (n) therebetween.

Figure 2:
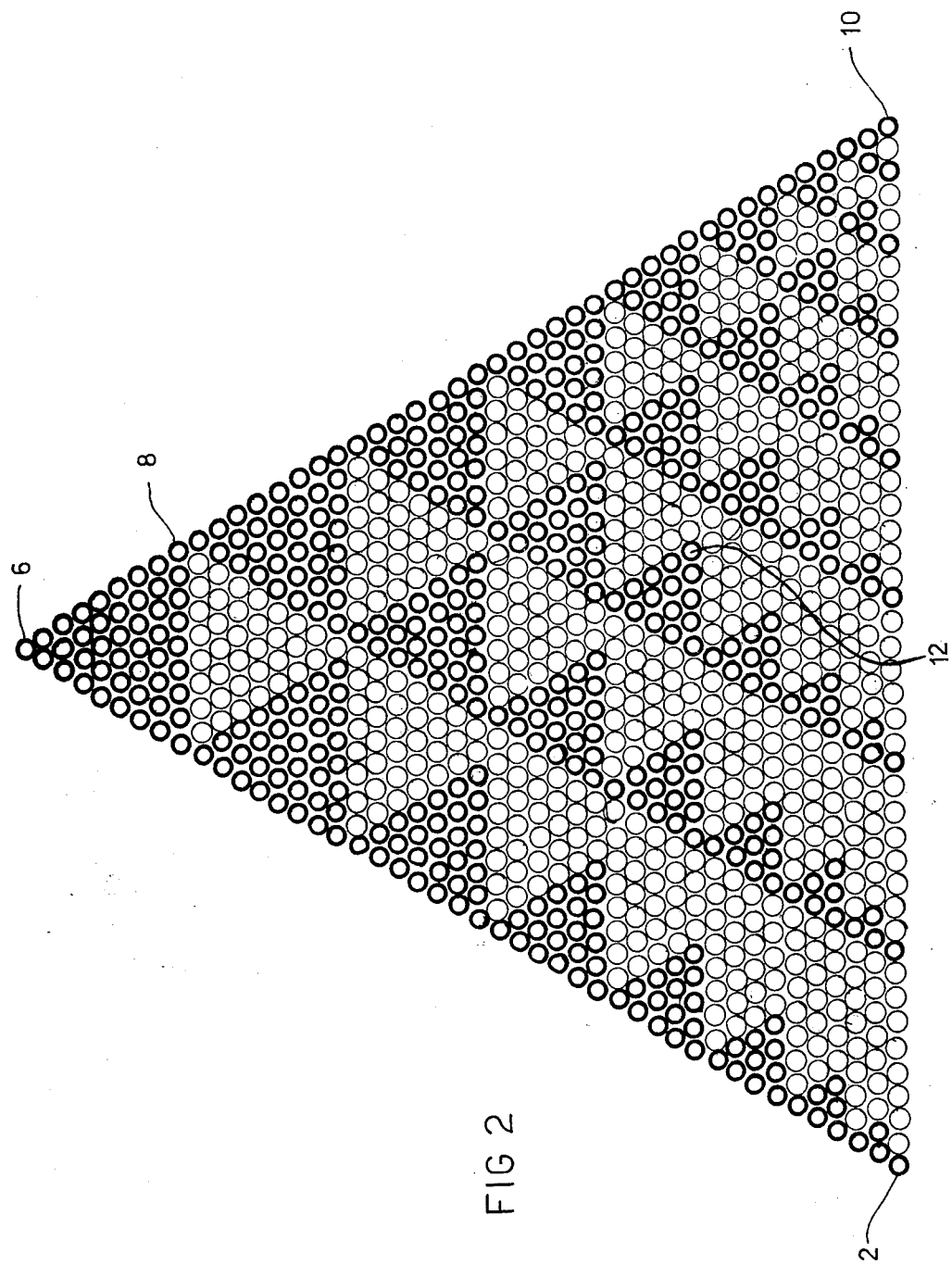
FIG. 2 is a schematic illustration of a color chart based on five basic colors and nine subdivisions between basic colors.

Referring now to FIG. 2 it can be seen that using the same model and the same number of basic colors upon the increase of the number of subdivisions between colors from 5 to 9, there are generatable all of the 495 possible colors based thereon wherein the interrelationship between each of the colors formed is clearly defined solely by reference to its component coordinates, e.g., basic color point 6 will be designated 0,0,8,0,0 while color point 12 will be unequivocally identified by coordinate value 2,0,0,4,2 indicating that it is composed respectively of two parts of basic color 2, four parts of basic color 8 and two parts of basic color 10.

Figure 3:
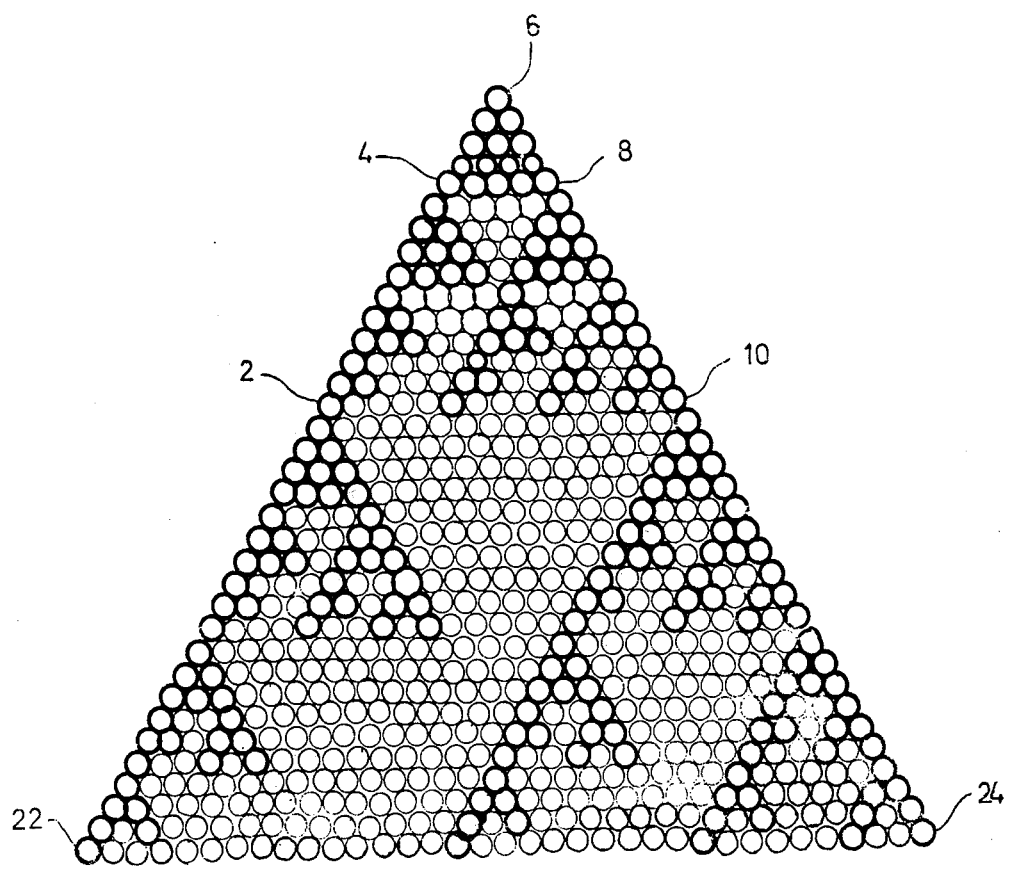
FIG. 3 is a schematic illustration of a color chart based on seven basic colors and five subdivisions therebetween.

Referring now to FIG. 3 there is illustrated the array generatable based on seven basic colors and five subdivisions therebetween. As can be seen with specific reference to said figure said array is preferably formed of single color points and triangular groupings of color points having equilateral sides whereby there are formed patterns of linearly aligned color points and triangle sides.

Thus when m is an odd integer said array outlines an equilateral triangular pattern characterized in that the basic color points 22, 2, 4, 6, 8, 10 and 24 are linearly spaced along the sides of said triangular pattern with three of the basic colors 22, 6 and 24 being positioned at the apices of the triangular pattern, the remaining color points on said sides representing the various transitional color intervals between the basic colors of said respective sides and said sides being formed by the linear alignment of the sides of said respective triangular groupings.

It is to be noted however, that when m is an even integer e.g. m—6 that there is generated a non-equalateral triangular pattern wherein, e.g., color points 22, 6 and 10 form the apices of the pattern.

Furthermore as can be seen very clearly with reference to FIG. 1, however as evident also from FIGS. 2 and 3, said array is preferably developed with the colors transitional between basic colors on different sides of said triangular pattern being represented by color points arranged within the confines of said triangular pattern and by the arrangement of aligned triangular groupings and color points representing said transitional colors extending from sides of the triangular patterns towards the base thereof.

Among the advantages of the method of the present invention are the facts that:

(a) The presentation of the color scheme in terms of the base colors as independent variables, allows the presentation of every color as a vector in said space, and therefore all of the algebraic steps taken in the description, are possible, with regard to the separation and combination of colors;

(b) the basing of the method on basic colors and the chosen number of subdivisions therebetween permits as was already stated, the adjustment of the preciseness of the colors, as needed, and especially the development and expansion of sections of said color array as desired;

(c) since every color is represented as an algebraic expression it is possible to describe, relatively easily with symbols, the change of colors, passing from one color to another and explaining the origin of a certain color, and (d) the symbol of the color (vector) itself, expresses the degree of chromaticity (purity) in it and the extent of brightness according to the functions of value and chroma assumed and assigned thereto.

Thus the present invention provides a novel tool to the color producing industry and to all those who work with colors to systematically develop and identify and/or use every possible color generatable.

It will be evident to those skilled in the art that the invention is not limited to the details of the foregoing illustrative embodiments and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, and all changes which come with the meaning and range of equivalency of the claims are therefore intended to be embraced therein.

What is claimed is:

1. A method for organizing and developing a multipigment color chart for the production and reproduction of any and all colors based on at least five basic colors (m) and any chosen number (n) of subdivisions therebetween comprising developing a two dimensional array of a plurality of planar triangular groupings of distinct color points wherein the apices of each triangular grouping represents the color extremes of said groupings and the remaining color points within said grouping are arranged in equidistant transitional color intervals between said apices and between the apices of any sub-triangles definable within the groupings, said groupings representing planar cuts of an m−1 dimensional pyramid the apices of which pyramid represent the basic colors chosen; and assigning to each color point in said array a composite coordinate value having a number of component coordinates equal to the number of basic colors used and representing the absolute amount of each basic color component of said color point, wherein the sum of all composite coordinate values for each point within the array is equal.

2. A chart for organizing, developing and depicting a multipigment scale of colors based on at least five basic colors (m) and any chosen number (n) of subdivisions therebetween comprising a two dimensional array of a plurality of planar triangular groupings of distinct color points wherein the apices of each triangular grouping represents the color extremes of said grouping and the remaining color points within said grouping are arranged in equidistant transitional color intervals between said apices and between the apices of any sub-triangles definable within the groupings and wherein said groupings represent planar cuts of an m−1 dimensional pyramid the apices of which pyramid represent the basic colors chosen.

3. A chart according to claim 2 wherein each color point in said array is assigned a composite coordinate value having a number of component coordinates equal to the number of basic colors used and representing the absolute amount of each basic color component of said color point and wherein the sum of all composite coordinate values for each point within the array is equal.

4. A chart according to claim 3 wherein said sum is a multiple of (n−1) wherein n is the chosen number of subdivision between each pair of basic colors in said chart including the color points of said basic colors themselves.

5. A chart according to claim 2 wherein said array outlines a triangular pattern characterized in that the basic color points are linearly spaced along the sides of said triangular pattern with three of the basic colors being positioned at the apices of the triangular pattern, the remaining color points on said sides represent the various transitional color intervals between the basic colors of said respective sides and said sides are formed by the linear alignment of the sides of said respective triangular groupings.

6. A chart according to claim 2 wherein said array is formed of single color points and triangular groupings of color points having equilateral sides whereby there are formed patterns of linearly aligned color points and triangle sides.

7. A chart according to claim 5 wherein colors transitional between basic colors on different sides of said triangular pattern are represented by color points arranged within the confines of said triangular pattern by the arrangement of aligned triangular groupings and color points extending from sides of the triangular patterns towards the base thereof.

8. A method for the controlled production of any and all colors based on at least five basic colors and any chosen number of subdivisions therebetween comprising taking a two dimensional array of a plurality of color points and planar triangular groupings of distinct color points wherein each color point in said array is assigned a composite coordinate value having a number of component coordinates equal to the number of basic colors used and representing the absolute amount of each basic color component of said color point, the sum of all composite coordinate values for each point within the array being equal to, or a multiple of, $(n-1)$, wherein n is the chosen number of subdivision between each pair of basic colors including the color points of said basic colors themselves, and wherein the apices of each triangular grouping within the array represents the color extremes of said grouping and the remaining color points within said grouping are arranged in equidistant transitional color intervals between said apices and between the apices of any sub-triangles definable within the groupings, said groupings representing planar cuts of an $m-1$ dimensional pyramid the apices of which pyramid represent the basic colors chosen; and mixing the amount of each basic color assigned to the composite coordinate value of the color point chosen for production, whereby any and all of the colors producible given the chosen number (m) of basic colors and the chosen number (n) of subdivisions therebetween is producible.

* * * * *